United States Patent [19]
Fakhr et al.

[11] Patent Number: 6,006,182
[45] Date of Patent: Dec. 21, 1999

[54] SPEECH RECOGNITION REJECTION METHOD USING GENERALIZED ADDITIVE MODELS

[75] Inventors: Waleed Fakhr, Verdun; Serge Robillard, Lachine; Vishwa Gupta, Brossard; Real Tremblay, Montreal; Michael Sabourin, St. Lambert; Jean-Francois Crespo, Laval, all of Canada

[73] Assignee: Northern Telecom Limited, Montreal, Canada

[21] Appl. No.: 08/934,892

[22] Filed: Sep. 22, 1997

[51] Int. Cl.$^6$ ................................ G10L 5/06; G10L 9/00
[52] U.S. Cl. .................. 704/231; 704/239; 704/251; 704/256
[58] Field of Search ..................... 704/231, 233, 704/234, 238, 239, 240, 251, 256

[56] References Cited

U.S. PATENT DOCUMENTS

| | | | |
|---|---|---|---|
| 5,097,509 | 3/1992 | Lennig | 704/240 |
| 5,799,276 | 8/1998 | Komissarchik et al. | 704/251 |
| 5,812,972 | 9/1998 | Juang et al. | 704/234 |
| 5,842,162 | 11/1998 | Fineberg | 704/233 |
| 5,842,163 | 11/1998 | Weintraub | 704/240 |
| 5,848,388 | 12/1998 | Power et al. | 704/239 |

*Primary Examiner*—Susan Wieland
*Attorney, Agent, or Firm*—Finnegan, Henderson, Farabow, Garrett & Dunner, L.L.P.

[57] ABSTRACT

Systems and methods consistent with the present invention determine whether to accept one of a plurality of intermediate recognition results output by a speech recognition system as a final recognition result. The system first combines a plurality of speech rejection features into a feature function in which weights are assigned to each rejection feature in accordance with a recognition accuracy of each rejection feature. Feature values are then calculated for each of the rejection features using the plurality of intermediate recognition results. The system next computes the feature function according to the calculated feature values to determine a rejection decision value. Finally, one of the plurality of intermediate recognition results is accepted as the final recognition result according to the rejection decision value.

28 Claims, 3 Drawing Sheets

SPEECH RECOGNITION REJECTION METHOD USING GENERALIZED ADDITIVE MODELS

BACKGROUND OF THE INVENTION

A. Field of the Invention

The present invention relates to methods and systems for accepting recognition results determined by a speech recognition system. More particularly, the present invention relates to methods and systems for accepting recognition results using generalized additive modeling.

B. Description of the Related Art

Speech recognition systems typically employ a recognition rejection method to prevent incorrect recognitions and detect out of vocabulary speech. Erroneously recognized speech may occur, for example, from an error in the system or because the user utters a word that is not in the system's vocabulary. Speech recognition systems prevent these errors by including a rejection classifier that is trained using a speech training set to recognize speech.

U.S. Pat. No. 5,097,509 (the '509 patent) discloses a rejection method and classifier for speech recognition. According to this method, the rejection classifier creates a histogram for each feature and then combines weighted versions of each histogram. From the weighted histogram data, the rejection classifier determines a probability value that indicates whether the recognition result should be rejected.

In the '509 patent, however, the rejection classifier must recalculate the histogram weights for each new application. This is burdensome when a large number of rejection features are used to increase the accuracy of the rejection classifier. Another problem occurs when the top number of matches contain words that are confusingly similar to one another. In this case, the confidence in the recognition result will be low since the recognition will be an arbitrary selection among the confusingly similar words. The method of the '509 patent, however, cannot detect when the top number of matches contain words that are confusingly similar to one another. Therefore, a rejection classifier is desired that can use a large number of rejection features and which can detect when the top matches contain confusingly similar words. Furthermore, a rejection classifier is desired that can combine additional features to increase rejection accuracy.

SUMMARY OF THE INVENTION

Systems and methods consistent with the present invention provide an automatic rejection classifier, for use with a speech recognition system, that can use a wide range of rejection features. Accordingly, the rejection classifier can efficiently and accurately determine whether the recognition choice is correct.

To achieve these and other advantages, a method for accepting one of a plurality of intermediate recognition results output by a speech recognition system as a final recognition result, consistent with the present invention, includes the step of combining a plurality of speech rejection features into a feature function in which weights are assigned to each rejection feature in accordance with a recognition accuracy of each rejection feature. Feature values are then calculated for each of the rejection features using the plurality of intermediate recognition results. The next step is computing the feature function according to the calculated feature values to determine a rejection decision value. Finally, one of the plurality of intermediate recognition results is accepted as the final recognition result according to the rejection decision value.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION

A. Overview

Rejection methods consistent with the present invention combine a plurality of rejection features into one feature function. Generalized additive models (GAM) are used to create a GAM function using the plurality of rejection features as input values. The GAM function weights each rejection feature according to its accuracy in discriminating speech. The GAM function, therefore, enables more accurate determination of whether to accept or reject the recognition results output by a speech recognition system.

B. Structure

Figure 1:
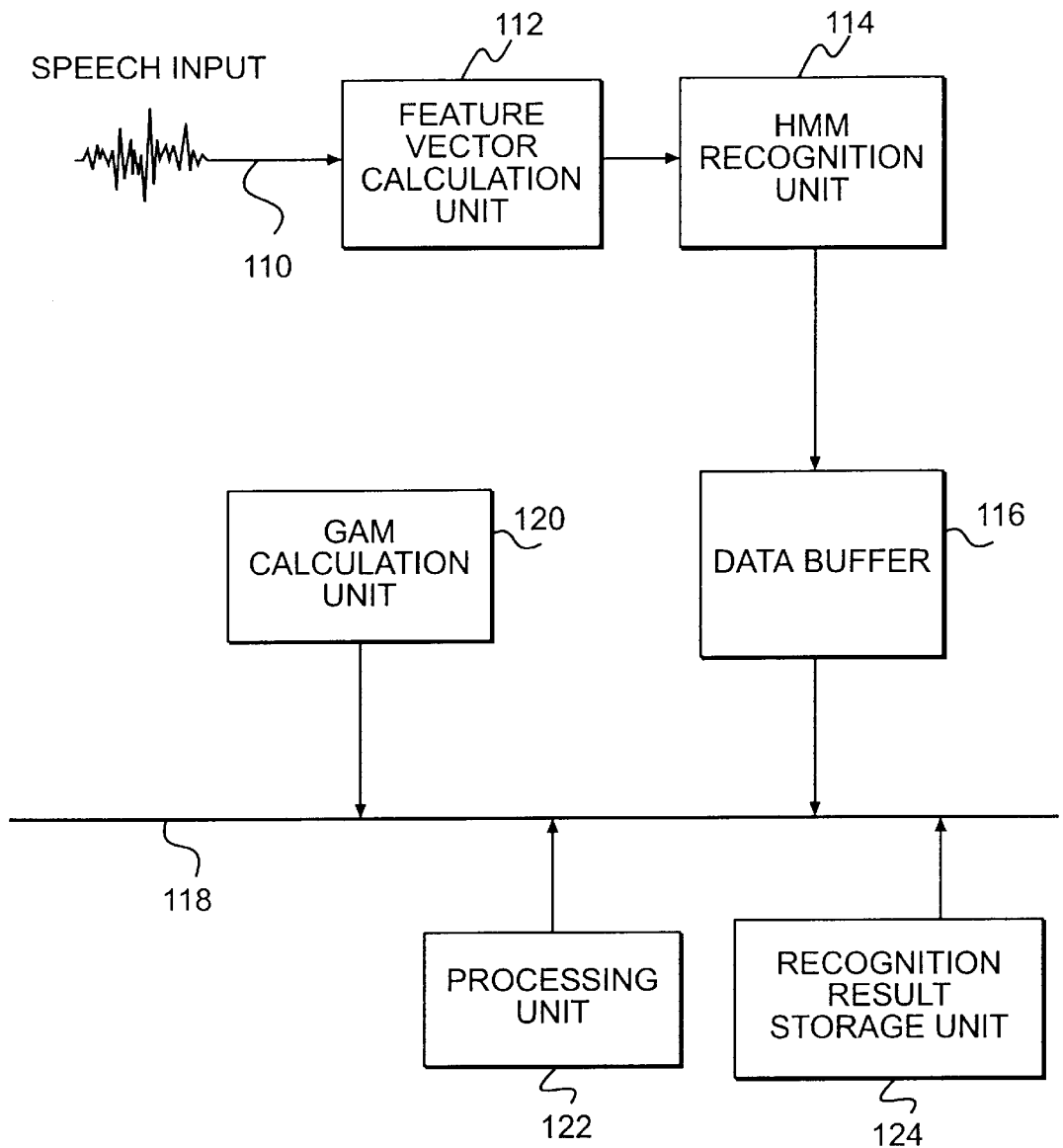
FIG. 1 is a block diagram of a speech recognition system consistent with the present invention.

FIG. 1 is a block diagram of a speech recognition system consistent with the present invention. The speech recognition system may, for example, be a part of an automatic directory assistance system that automatically determines the telephone corresponding to a phrase uttered by a user. As shown in FIG. 1, the speech recognizer includes an input for speech 110 and a feature vector calculation unit 112 for determining feature parameters of the speech signal. The feature parameters are input to a Hidden Markov Model (HMM) recognition unit 114 that outputs recognition result choices to a data buffer 116 connected to a data bus 118. Also connected to data bus 118 is a GAM calculation unit 120, a processing unit 122, and a recognition result storage unit 124.

Feature vector calculation unit 112 and HMM recognition unit 114 are well known in the art and provide a plurality of intermediate recognition results ranked according to a score associated with each intermediate recognition result. Intermediate result storage unit 116 stores the ranked intermediate recognition results output from HMM recognition unit 114. To chose one of the ranked results as the final recognition result, processing unit 122 applies a GAM function stored in GAM storage unit 120 to each intermediate recognition result. Processing unit 122 then calculates a rejection decision value R indicating whether each intermediate recognition result should be accepted or rejected as the final recognition result. Recognition result storage unit 124 stores the final recognition result output by processing unit 122.

C. Generalized Additive Modeling (GAM)

Speech recognition systems consistent with the present invention preferably use GAM to determine the accuracy of a recognition result. For additional description related to computations involving GAM, see Generalized Linear Models, P. McCullogh & J. A. Nelden, Chapman and Hall, 1989, Chapter 15, which is herein incorporated by reference. The GAM function combines a plurality of rejection features into one feature function to enable a higher degree of dimensionality and, therefore, more accurate speech discrimination by the speech recognition system. An important aspect of the GAM function is that it weights each rejection feature according to its relative ability to discriminate between correct recognition results. Thus, rejection features that identify correct recognition results are weighted more heavily than those feature vectors which do not perform as well.

A GAM function R(f) consistent with the present invention is defined by the following equation:

$$R(f) = \frac{1}{1 + \exp\left(-\left(\theta + \sum_{j=1}^{J}\sum_{k=1}^{K}(\delta_j \times F(f_{j,k}, \alpha_{j,k}))\right)\right)}$$

where: θ represents an offset value; δ represents a weighing factor; F(f,α) represents the function describing each rejection feature f; J represents the number of rejection features that are combined in the GAM function R(f); K represents the order of function F; and R(f) ranges in value from 0 to 1.

The function $F(f_j, \alpha)$ is a polynomial of the order K and is described by the following equation:

$$F(f_i, \alpha) = \alpha_{i,1}f_i + \alpha_{i,2}f_i^2 + \alpha_{i,3}f_i^3 + \ldots \alpha_{i,K}f_i^K$$

The α coefficients represent the coefficients of each feature modeled by the GAM function R(f). The number of α coefficients is dependent upon the order K. The value K is chosen to reduce the modeling error of the polynomial. In systems consistent with the present invention, function F has an order K=3, but it should be appreciated that polynomials of other orders may be used. Although one of ordinary skill in the art will recognize that there are many methods available to select the value K, the order of the polynomial function may be determined by setting the order to an initial high value and then working downward until an optimal order is reached by measuring the GAM modeling error.

Figure 2:
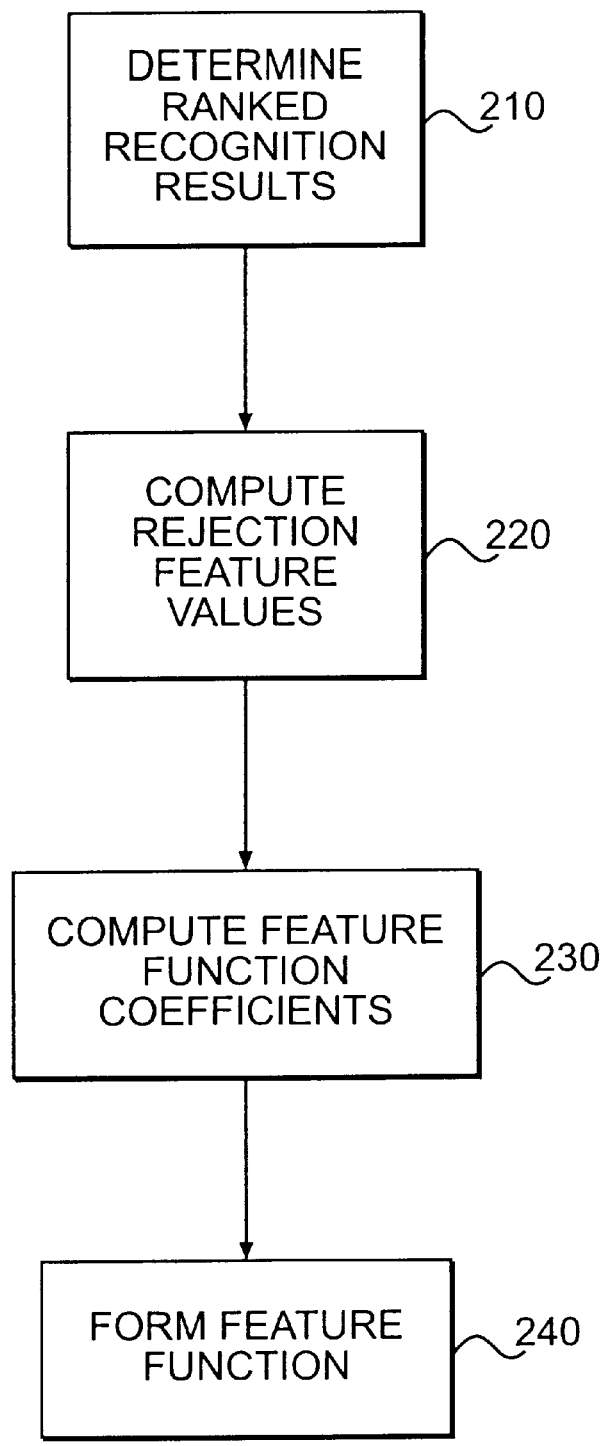
FIG. 2 is a flow diagram showing a training method consistent with the present invention for determining a feature function.

FIG. 2 is a flow diagram illustrating a preferred training method, consistent with the invention, for determining the coefficients of the GAM function. As shown in FIG. 2, feature vector calculation unit 112 and HMM recognition unit 114 process an input speech signal 110 according to methods well known in the art to determine a plurality of recognition results ranked by recognition scores (step 210). During training, input speech signal 110 is speech from a recognition training set comprising spoken words with known classifications. Processing unit 122 then uses the ranked recognition results to compute the GAM rejection feature values f that will be used in the GAM function (step 220).

In systems consistent with the present invention, any number of rejection features may be used in the GAM function. The rejection features are preferably the following: (1) a score-per-frame feature that describes the top match found by the recognizer; (2) a score ratio feature that describes the ratio formed between the top two matches found by the recognizer; (3) a score spread feature that describes the number of hypothesis matches having scores located within a predetermined range; (4) a normalized score difference feature that describes the difference between the top match found by the recognizer and the top match found by a phonemic graph recognizer; (5) a allophone number feature that describes the number of allophone models used in the top match found by the recognizer; (6) a confusability feature that describes the rank of the first non-confusable word relative to the top choice; and (7) the weighted Levinstein distance between words. For additional description of these rejection features, see U.S. Pat. No. 5,097,509, which is herein incorporated by reference.

Rejection features (5)–(7) describe characteristics of the particular words recognized, and are referred to as word-specific information. The latter of these rejection features, the Levinstein distance, is the distance between the top match and each of the N following matches found by the recognizer. Calculation of the weighted Levinstein distance requires calculation of the Levinstein distance between two phonemic transcriptions. Suitable methods are known for computing the Levinstein distance between two strings, and include, for example, a method using maximum substring matching and a method using the Viterbi search algorithm across a transcription graph. For the reader's convenience, an exemplary Levinstein distance calculation will now be described.

Calculating the Levinstein distance involves "editing" a first string to transform it into a second string. Three different types of edits are used to perform the following transformations: (1) substitution, (2) deletion, and (3) insertion. For example, the substitution transformation {'w', 'f'} may indicate that "wish" should be transformed into "fish"; the deletion transformation {'t', ' '} may indicate that "tent" is to become "ten"; and the insertion transformation {' ', 'h'} may indicate that "tent" is to become "tenth." Each substitution, deletion, or insertion is defined to involve only a single character symbol.

The Levinstein distance is the number of substitutions, deletions, or insertions required to transform the first phonemic transcription, T1, into the second, T2. Multiple sets may be possible between T1 and T2. For example, "fishing" to "fashion" can be transformed as {'i', 'a'}, {' ', 'o'}, and {'g', ' '}; or as {'i', 'a'}, {'n', 'o'}, and {'g', 'n'}. In this example, each transformation set has a Levinstein distance of three.

Returning to FIG. 2, once the values for the rejection features have been calculated, processing unit 122 determines the α, δ, and θ coefficients for the GAM function (step 230). The α, δ, and θ coefficients are preferably determined using a gradient logistic regression method known to those of ordinary skill in the art. During this process, the α, δ, and θ coefficients are reiteratively calculated using each of the words of the recognition training set. Finally, processing unit 122 forms the GAM function using coefficients α, δ, and θ and stores the GAM function in GAM storage unit 120 (step 240).

Figure 3:
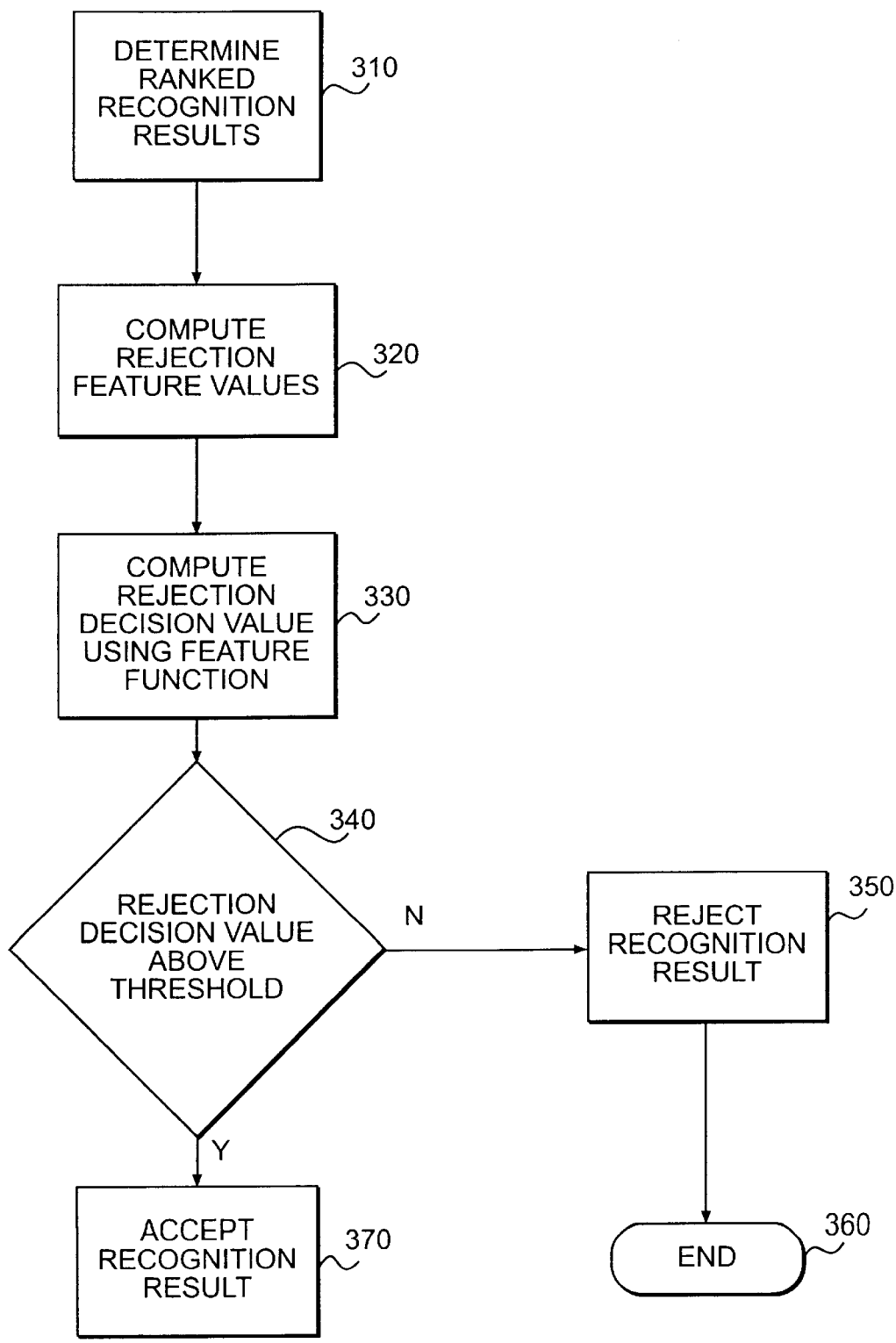
FIG. 3 is a flow diagram showing a recognition method consistent with the present invention.

The GAM function is then used during a recognition process to determine whether to accept or reject a recognition result computed from an unknown speech signal. FIG. 3 is a flow diagram showing a speech recognition method using the GAM function. As shown in FIG. 3, feature vector calculation unit 112 and HMM recognition unit 114 process an input speech signal 110, according to methods well known in the art, to determine a plurality of ranked recognition results (step 310). During recognition, input speech signal 110 is an unknown speech signal uttered by a user of the speech recognition system. Processing unit 122 then uses the ranked recognition results to compute the GAM rejection features that will be used in the GAM function (step 320).

Using the GAM function stored in GAM storage unit 120, processing unit 122 calculates a rejection decision value R indicating whether the top recognition result, stored in intermediate result unit 116, should be accepted or rejected as the final recognition result (step 330). As described above, the GAM function stored in GAM storage unit 120 is the GAM function computed during a previous training stage. Each of the coefficients α, δ, and θ will, therefore, have been preset in GAM storage unit 120. The computed GAM rejection features f are then substituted in the GAM function R(f), and R(f) is solved to produce the rejection decision value.

The rejection decision value R ranges from 0 to 1 and is compared to a threshold value to determine whether the top recognition result should be accepted (step 340). If the rejection decision value is below the threshold value, then the top recognition result is rejected and the recognition process ends (steps 350 and 360). Otherwise, processing unit 122 determines that the top recognition result is correct and accepts it as the final recognition result for storage in recognition result storage unit 124 (step 370). The threshold value can be adjusted depending upon the accuracy required for a given application. For most applications, the threshold value will be in the range from approximately 0.6 to 0.9, with the higher values favoring less false acceptance at the expense of more false rejection.

C. Conclusion

It will be apparent to those skilled in the art that various modifications and variations can be made to the system and method of the present invention without departing from the spirit or scope of the invention. For example, additional features may be added to the GAM function during the recognition process to further refine the rejection accuracy. In this case, the GAM function coefficients would be recomputed using the method described above. The present invention covers the modifications and variations of this invention provided they come within the scope of the appended claims and their equivalents.

What is claimed is:

1. A computer-implemented method for accepting one of a plurality of intermediate recognition results output by a speech recognition system as a final recognition result, the method comprising the steps of:

combining a plurality of speech rejection features into a generalized additive model (GAM) feature function in which weights are assigned to each rejection feature in accordance with a recognition accuracy of each rejection feature;

calculating feature values for each of the rejection features using the plurality of intermediate recognition results;

computing the GAM feature function according to the calculated feature values to determine a rejection decision value; and accepting one of the plurality of intermediate recognition results as the final recognition result according to the rejection decision value.

2. The method of claim 1, wherein the GAM feature function includes a plurality of coefficients, and wherein the method further includes the step of:

using a speech training set to determine the coefficients of the GAM feature function.

3. The method of claim 1, wherein the feature function is defined by the following equation:

$$R(f) = \frac{1}{1 + \exp\left(-\left(\theta + \sum_{j=1}^{J} \sum_{k=1}^{K} (\delta_j \times F(f_{j,k}, \alpha_{j,k}))\right)\right)}$$

where: θ represents an offset value; δ represents a weight; F(f,α) represents a function describing each rejection feature f; J represents the number of rejection features that are combined in the equation for R(f); K represents the order of function F; and R(f) ranges in value from 0 to 1.

4. The method of claim 3, wherein the function $F(f_j, \alpha)$ describing each rejection feature is defined by the following equation:

$$F(f_i, \alpha) = \alpha_{i,1} f_i + \alpha_{i,2} f_i^2 + \alpha_{i,3} f_i^3.$$

5. The method of claim 3, wherein the function $F(f_j, \alpha)$ is a polynomial having an order K and wherein the combining step further includes the substep of:

measuring a modeling error produced by the feature function for a plurality of values for K; and selecting the order K according to the measured modeling error.

6. The method of claim 3, wherein the α coefficients for each rejection feature are determined using a gradient logistic regression method.

7. The method of claim 1, wherein the rejection features are any one of the following rejection features: (1) a score-per-frame feature; (2) a score ratio feature; (3) a score spread feature; (4) a normalized score difference feature; (5) a allophone number feature; (6) a confusability feature; and (7) the weighted Levinstein distance between words.

8. The method of claim 1, wherein the step of accepting one of the plurality of intermediate recognition results as the final recognition result further includes the substeps of:

comparing the rejection decision value to a threshold value; and accepting one of the plurality of intermediate recognition results as the final recognition result according to whether the rejection decision value is above the threshold value.

9. The method of claim 1, wherein the plurality of intermediate recognition results are ranked according to a recognition score associated with each intermediate recognition result, and wherein the step of accepting one of the plurality of intermediate recognition results as the final recognition result further includes the substep of:

accepting the top ranked intermediate recognition result as the final recognition result.

10. A system for accepting one of a plurality of intermediate recognition results output by a speech recognition system as a final recognition result, the system comprising:

means for combining a plurality of speech rejection features into a generalized additive model (GAM) feature function in which weights are assigned to each rejection feature in accordance with a recognition accuracy of each rejection feature;

means for calculating feature values for each of the rejection features using the plurality of intermediate recognition results;

means for computing the GAM feature function according to the calculated feature values to determine a rejection decision value; and means for accepting one of the plurality of intermediate recognition results as the final recognition result according to the rejection decision value.

11. The system of claim 10, wherein coefficients of the GAM feature function are predetermined.

12. The system of claim 10, wherein the feature function is defined by the following equation:

$$R(f) = \frac{1}{1 + \exp-\left(\theta + \sum_{j=1}^{J}\sum_{k=1}^{K}(\delta_j \times F(f_{j,k}, \alpha_{j,k}))\right)}$$

where: $\theta$ represents an offset value; $\delta$ represents a weight; $F(f,\alpha)$ represents a function describing each rejection feature f; J represents the number of rejection features that are combined in the equation for R(f); K represents the order of function F; and R(f) ranges in value from 0 to 1.

13. The system of claim 12, wherein the function $F(f_j,\alpha)$ describing each rejection feature is defined by the following equation:

$$F(f_i,\alpha) = \alpha_{i,1}f_i + \alpha_{i,2}f_i^2 + \alpha_{i,3}f_i^3.$$

14. The system of claim 12, wherein the function $F(f_j,\alpha)$ is a polynomial having an order K and wherein the means for combining further includes:
   means for measuring a modeling error produced by the feature function for a plurality of values for K; and
   means for selecting the order K according to the measured modeling error.

15. The system of claim 12, wherein the means for combining further includes:
   means for determining the a coefficients for each rejection feature using a gradient logistic regression method.

16. The system of claim 10, wherein the rejection features are any one of the following rejection features: (1) a score-per-frame feature; (2) a score ratio feature; (3) a score spread feature; (4) a normalized score difference feature; (5) a allophone number feature; (6) a confusability feature; and (7) the weighted Levinstein distance between words.

17. The system of claim 10, wherein the means for accepting one of the plurality of intermediate recognition results as the final recognition result further includes:
   means for comparing the rejection decision value to a threshold value; and
   means for accepting one of the plurality of intermediate recognition results as the final recognition result according to whether the rejection decision value is above the threshold value.

18. The system of claim 10, wherein the plurality of intermediate recognition results are ranked according to a recognition score associated with each intermediate recognition result, and wherein the means for accepting one of the plurality of intermediate recognition results as the final recognition result further includes:
   means for accepting the top ranked intermediate recognition result as the final recognition result.

19. The system of claim 10, wherein the speech recognition system is a voice activated dialing system.

20. A computer program product containing instructions for causing a computer to execute a method for accepting one of a plurality of intermediate recognition results output by a speech recognition system as a final recognition result, the computer program product comprising:
   instructions for combining a plurality of speech rejection features into a generalized additive model (GAM) feature function in which weights are assigned to each rejection feature in accordance with a recognition accuracy of each rejection feature;
   instructions for calculating feature values for each of the rejection features using the plurality of intermediate recognition results;
   instructions for computing the GAM feature function according to the calculated feature values to determine a rejection decision value; and
   instructions for accepting one of the plurality of intermediate recognition results as the final recognition result according to the rejection decision value.

21. The computer program product of claim 20, wherein the feature function is defined by the following equation:

$$R(f) = \frac{1}{1 + \exp-\left(\theta + \sum_{j=1}^{J}\sum_{k=1}^{K}(\delta_j \times F(f_{j,k}, \alpha_{j,k}))\right)}$$

where: $\theta$ represents an offset value; $\delta$ represents a weight; $F(f,\alpha)$ represents a function describing each rejection feature f; J represents the number of rejection features that are combined in the equation for R(f); K represents the order of function F; and R(f) ranges in value from 0 to 1.

22. The computer program product of claim 21, wherein the function $F(f_j,\alpha)$ describing each rejection feature is defined by the following equation:

$$F(f_j,\alpha) = \alpha_{j,1}f_j + \alpha_{j,2}f_j^2 + \alpha_{j,3}f_j^3.$$

23. The computer program product of claim 21, wherein the function $F(f_j,\alpha)$ is a polynomial having an order K and wherein the combining instructions further includes:
   instructions for measuring a modeling error produced by the feature function for a plurality of values for K; and
   instructions for selecting the order K according to the measured modeling error.

24. The computer program product of claim 21, wherein the a coefficients for each rejection feature are determined using a gradient logistic regression method.

25. The computer program product of claim 20, wherein the rejection features are any one of the following rejection features: (1) a score-per-frame feature; (2) a score ratio feature; (3) a score spread feature; (4) a normalized score difference feature; (5) a allophone number feature; (6) a confusability feature; and (7) the weighted Levinstein distance between words.

26. The computer program product of claim 20, wherein the instructions for accepting one of the plurality of intermediate recognition results as the final recognition result further includes:
   instructions for comparing the rejection decision value to a threshold value; and
   instructions for accepting one of the plurality of intermediate recognition results as the final recognition result according to whether the rejection decision value is above the threshold value.

27. The computer program product of claim 20, wherein the plurality of intermediate recognition results are ranked according to a recognition score associated with each intermediate recognition result, and wherein the instructions for accepting one of the plurality of intermediate recognition results as the final recognition result further includes:
   instructions for accepting the top ranked intermediate recognition result as the final recognition result.

28. The computer program product of claim 20, wherein coefficients of the GAM feature function are predetermined.

* * * * *

UNITED STATES PATENT AND TRADEMARK OFFICE
CERTIFICATE OF CORRECTION

PATENT NO. : 6,006,182

DATED : December 21, 1999

INVENTOR(S) : Waleed Fakhr, et al.

It is certified that error appears in the above-identified patent and that said Letters Patent is hereby corrected as shown below:

Col. 3, line 33, change "a" to --$\alpha$--;

Claim 6, col. 6, line 24, change "a coefficients" to --$\alpha$ coefficients--;

Claim 15, col. 7, line 30, change "a coefficients" to --$\alpha$ coefficients--;

Claim 24, col. 8, line 36, change "a coefficients" to --$\alpha$ coefficients--.

Signed and Sealed this

Twelfth Day of September, 2000

*Attest:*

Q. TODD DICKINSON

*Attesting Officer*   *Director of Patents and Trademarks*